(12) United States Patent  
Bunting

(10) Patent No.: US 12,533,939 B2  
(45) Date of Patent: *Jan. 27, 2026

(54) ALL-TERRAIN CONSTRUCTION EQUIPMENT AND METHODS

(71) Applicant: Nathan Bunting, Red Bluff, CA (US)

(72) Inventor: Nathan Bunting, Red Bluff, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/770,100

(22) Filed: Jul. 11, 2024

(65) Prior Publication Data

US 2024/0359550 A1 Oct. 31, 2024

Related U.S. Application Data

(63) Continuation-in-part of application No. 15/066,572, filed on Mar. 10, 2016, now Pat. No. 12,036,861.

(60) Provisional application No. 62/130,780, filed on Mar. 10, 2015.

(51) Int. Cl.

| | |
|---|---|
| *B60K 3/00* | (2006.01) |
| *B60K 7/00* | (2006.01) |
| *B60K 17/356* | (2006.01) |
| *B62D 21/04* | (2006.01) |
| *B66C 23/80* | (2006.01) |
| *B66F 9/075* | (2006.01) |
| *B66F 11/04* | (2006.01) |
| *E02F 3/76* | (2006.01) |
| *E02F 9/02* | (2006.01) |
| *E02F 9/08* | (2006.01) |

(52) U.S. Cl.  
CPC .............. *B60K 3/00* (2013.01); *B60K 7/0015* (2013.01); *B60K 17/356* (2013.01); *B62D 21/04* (2013.01); *B66C 23/80* (2013.01); *B66F 11/044* (2013.01); *E02F 3/7609* (2013.01); *E02F 9/02* (2013.01); *E02F 9/085* (2013.01); *B60G 2200/322* (2013.01); *B60Y 2200/41* (2013.01); *B60Y 2200/64* (2013.01); *B66F 9/07559* (2013.01)

(58) Field of Classification Search  
CPC ........... B66C 23/80; B66C 23/78; B60G 9/02; B60G 2200/34; B60G 2200/32; B60G 2202/413; B60G 2300/35; E02F 9/085  
See application file for complete search history.

(56) References Cited

U.S. PATENT DOCUMENTS

| | | |
|---|---|---|
| 2,844,006 A | 7/1958 | Lutz et al. |
| 2,846,094 A | 8/1958 | Pilch |
| 3,070,038 A | 12/1962 | Toulmin, Jr. |

(Continued)

*Primary Examiner* — Emma K Frick  
(74) *Attorney, Agent, or Firm* — Wells St. John P.S.

(57) ABSTRACT

All-terrain construction vehicles are provided that can include: a central frame; a pair of axles, each of the axles extending substantially normally across an axis of the central frame and pivoting in relation thereto; and at least two pairs of wheels. The vehicles can include at least two pairs of levelers. The vehicles can include out-rigging operatively extending above the one axis and between an operator cab and fluid pump unit in at least one configuration, the pump and fluid therefrom operatively coupled to the axles and wheels, the axles, wheels, and pump being operatively controlled via an operator interface within the operator cab. The vehicle can include levelers along the one side of the axis of the frame configured to support a utility pole above the hydraulic fluid pump unit.

5 Claims, 23 Drawing Sheets

(56) References Cited

U.S. PATENT DOCUMENTS

| | | | |
|---|---|---|---|
| 3,073,397 A * | 1/1963 | Balogh | E21B 19/087 |
| | | | 173/159 |
| 3,112,830 A | 12/1963 | Podlesak | |
| 3,306,373 A | 2/1967 | Pitman et al. | |
| 3,333,717 A | 8/1967 | Scaperotto | |
| 3,365,214 A * | 1/1968 | Garnett | B66C 23/78 |
| | | | 212/305 |
| 3,604,533 A | 9/1971 | Eckels | |
| 3,606,048 A | 9/1971 | Long | |
| 3,631,991 A | 1/1972 | Wacht | |
| 3,690,387 A | 9/1972 | Dixon | |
| 3,771,610 A | 11/1973 | Leyrat | |
| 3,921,730 A | 11/1975 | Farre et al. | |
| 3,937,339 A | 2/1976 | Geis et al. | |
| 4,124,226 A * | 11/1978 | Phillips | B66C 23/80 |
| | | | 180/41 |
| 4,149,751 A | 4/1979 | Boyer | |
| RE30,021 E | 6/1979 | Olson et al. | |
| 4,246,978 A | 1/1981 | Schulz et al. | |
| 4,347,701 A | 9/1982 | Eddens et al. | |
| 4,363,409 A * | 12/1982 | Laurich-Trost | B66F 9/061 |
| | | | 414/547 |
| 4,580,797 A | 4/1986 | Ericsson | |
| 4,601,000 A | 7/1986 | Montabert | |
| 4,641,716 A | 2/1987 | Sjalander | |
| 4,645,084 A | 2/1987 | Dieke | |
| 4,750,751 A | 6/1988 | Schafer | |
| 4,890,958 A | 1/1990 | Dancer | |
| 5,112,184 A | 5/1992 | Tapper et al. | |
| 5,171,124 A | 12/1992 | Foster | |
| 5,558,169 A | 9/1996 | Madgwick et al. | |
| 5,630,477 A | 5/1997 | Minatre | |
| 5,687,809 A | 11/1997 | Braud | |
| 5,778,569 A | 7/1998 | Schaeff | |
| 6,048,161 A | 4/2000 | Merlo et al. | |
| 6,193,440 B1 | 2/2001 | Pidgeon et al. | |
| 6,257,818 B1 | 7/2001 | Wiemeri et al. | |
| 6,301,811 B1 | 10/2001 | Gilmore, Jr. | |
| 6,308,441 B1 | 10/2001 | Bolitho | |
| 6,336,784 B1 | 1/2002 | Monaghan | |
| 6,398,242 B1 | 6/2002 | Niwa et al. | |
| 6,494,515 B1 | 12/2002 | Kalbfleisch | |
| 6,527,063 B2 | 3/2003 | Rust et al. | |
| 6,554,558 B2 | 4/2003 | Knight | |
| 6,592,316 B2 | 7/2003 | Hensler | |
| 6,802,687 B2 | 10/2004 | Litchfield et al. | |
| 7,383,906 B2 | 6/2008 | Sewell | |
| 7,625,165 B2 | 12/2009 | Bunting | |
| 7,874,391 B2 | 1/2011 | Dahl et al. | |
| 8,103,418 B2 | 1/2012 | Osswald et al. | |
| 8,539,699 B2 | 9/2013 | Ramun | |
| 8,657,335 B2 * | 2/2014 | Borghi | B66C 23/80 |
| | | | 280/765.1 |
| 8,696,025 B2 * | 4/2014 | Forini | B66C 23/80 |
| | | | 280/765.1 |
| 9,394,667 B2 * | 7/2016 | Lotti | B60S 9/02 |
| 9,434,586 B2 | 9/2016 | Ross, Jr. et al. | |
| 10,246,148 B2 | 4/2019 | Einola et al. | |
| 10,407,112 B2 | 9/2019 | Marleau et al. | |
| 10,544,020 B2 | 1/2020 | Delzenne et al. | |
| 11,035,096 B1 | 6/2021 | Bunting et al. | |
| 11,298,998 B2 | 4/2022 | Spazio | |
| 2008/0314854 A1 | 12/2008 | Kamiya et al. | |
| 2014/0031977 A1 | 1/2014 | Goldenberg et al. | |
| 2014/0360811 A1 | 12/2014 | Ross, Jr. et al. | |
| 2015/0084301 A1 | 3/2015 | Johnson | |
| 2017/0190366 A1 | 7/2017 | Steben et al. | |

\* cited by examiner

ALL-TERRAIN CONSTRUCTION EQUIPMENT AND METHODS

CROSS REFERENCE TO RELATED APPLICATION

This application is a continuation-in-part of U.S. patent application Ser. No. 15/066,572 which was filed Mar. 10, 2016, entitled "All-Terrain Construction Equipment and Methods", which claims priority to U.S. Provisional Patent Application Ser. No. 62/130,780 which was filed on Mar. 10, 2015, the entirety of each of which is incorporated by reference herein.

TECHNICAL FIELD

The technical field of the disclosure is all-terrain construction equipment and methods, particularly all-terrain vehicles for use in construction.

BACKGROUND

Outside urban areas, construction equipment is needed to facilitate the repair of utilities, for example. As opposed to urban areas, the landscape of non-urban areas is neither flat nor improved, but rugged, and can cause problems for construction equipment that is typically used in urban areas.

For example, utility lines, such as power lines span thousands of miles throughout North America. These power lines are typically strung along utility poles that are spaced along deforested paths crisscrossing vast wilderness areas. These paths are inaccessible to typical construction equipment. The present disclosure provides all-terrain construction equipment and methods that may be utilized in non-urban areas, for example.

SUMMARY OF THE DISCLOSURE

All-terrain construction vehicles are provided that can include: a central beam frame extending from a rear end of the vehicle to a front end of the vehicle, the length between the rear end of the beam frame to the front end of the frame defining at least one axis; a pair of axles, one associated with the rear end of the vehicle and the other associated with the front end of the vehicle, each of the axles extending substantially normally across the one axis and pivoting in relation thereto; at least two pairs of wheels, each wheel of each pair operatively coupled to each end of each respective axle, each of the wheels pivotably attached to each end and configured to pivot in parallel with an opposing wheel; an operator cab along one side of the one axis; and a hydraulic fluid pump unit along the opposing side of the one side of the one axis, the pump and fluid therefrom operatively coupled to the axles and wheels, the axles, wheels, and pump being operatively controlled via an operator interface within the operator cab.

All-terrain construction vehicles are provided that can include: a central frame extending from a rear end of the vehicle to a front end of the vehicle, the length between the rear end of the frame to the front end of the frame defining at least one axis; a pair of axles, one associated with the rear end of the vehicle and the other associated with the front end of the vehicle, each of the axles extending substantially normally across the one axis; at least two pairs of wheels, each wheel of each pair operatively coupled to each end of each axle; an operator cab along one side of the one axis; a hydraulic fluid pump unit along the opposing side of the one side of the one axis, the pump and fluid therefrom operatively coupled to the axles and wheels, the axles, wheels, and hydraulic fluid pump being operatively controlled via an operator interface within the operator cab; an out-rigging operatively coupled toward the rear end of the central frame and extending above the one axis and between the cab and fluid pump unit in at least one configuration.

All-terrain construction vehicles are provided that can include: a central frame extending from a rear end of the vehicle to a front end of the vehicle, the length between the rear end of the frame to the front end of the frame defining at least one axis; at least two pairs of levelers, one pair associated with the rear end of the vehicle and the other pair associated with the front end of the vehicle, each of the levelers comprising an arm and a foot, the arm extending from the one axis and configured to move the foot independently between a leveling position and a travel position; an operator cab along one side of the one axis; a hydraulic fluid pump unit along the opposing side of the one side of the one axis, the pump and fluid therefrom operatively coupled to the levelers, the movement of the levelers being operatively controlled via an operator interface within the operator cab; and wherein in the traveling position, the levelers along the one side of the axis are configured to support a utility pole above the hydraulic fluid pump.

All-terrain construction vehicles are provided that can include: a central beam frame extending from a rear end of the vehicle to a front end of the vehicle, the length between the rear end of the beam frame to the front end of the frame defining at least one axis; a pair of axles, one associated with the rear end of the vehicle and the other associated with the front end of the vehicle, each of the axles extending substantially normally across the one axis and pivoting in relation thereto; at least two pairs of wheels, each wheel of each pair operatively coupled to each end of each respective axle, each of the wheels pivotably attached to each end and configured to pivot in parallel with an opposing wheel; at least two pairs of levelers, one pair associated with the rear end of the vehicle and the other pair associated with the front end of the vehicle, each of the levelers comprising an arm and a foot, the arm extending from the one axis and configured to move the foot independently between a leveling position and a travel position; out-rigging operatively coupled toward the rear end of the central frame and extending above the one axis and between the cab and fluid pump unit in at least one configuration; an operator cab along one side of the one axis; and a hydraulic fluid pump unit along the opposing side of the one side of the one axis, the pump and fluid therefrom operatively coupled to the axles and wheels, the axles, wheels, and pump being operatively controlled via an operator interface within the operator cab; and wherein in the traveling position, the levelers along the one side of the axis are configured to support a utility pole above the hydraulic fluid pump.

BRIEF DESCRIPTION OF DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

The all-terrain construction vehicles and methods of the present disclosure will be described with reference to FIGS. 1-19.

Figure 1:
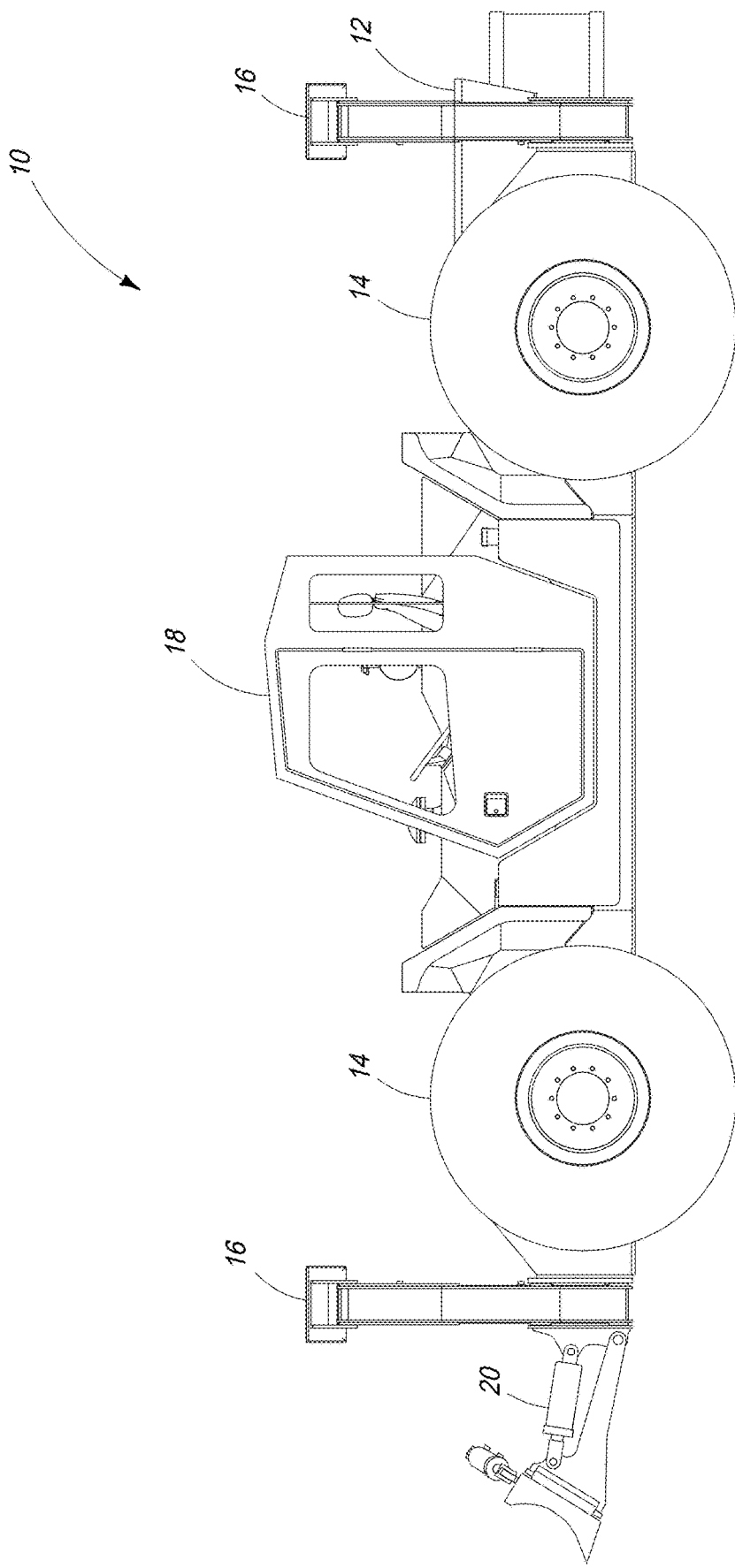
FIG. 1 is an example depiction of an all-terrain construction vehicle according to an embodiment of the disclosure.

Referring first to FIG. 1, an all-terrain construction vehicle 10 is shown that includes a beam frame 12 that extends the length of the vehicle from the rear end of the vehicle to the front end of the vehicle. The length between the rear end of the frame and front end of the frame defines at least one axis. Frame 12 can be a box beam. Frame 12 can be a fabricated metal or structural steel frame, for example, and frame 12 may take on an I-beam configuration wherein the upper portions provide platforms and the lower portions provide platforms, and they may be connected by another member that is normal between both platforms. The frame can be a fabricated metal frame or structure. The frame can provide for platform mounting on top, bottom, and/or sides as well.

Along this frame 12 can be wheels 14, and on opposing ends of frame 12 can be the levelers 16. While the levelers are depicted as two pairs, a single pair operatively associated with frame 12 may be sufficient for some applications. Upon the frame can be an open or enclosed operator cab 18, as well at the end of frame 12 can be a blade 20.

The blade 20, levelers 16, and wheels 14 can all be manipulated via an engine, to be disclosed later, that also may drive hydraulics for the manipulation of the blade levelers and wheel angle, for example.

Figure 2:
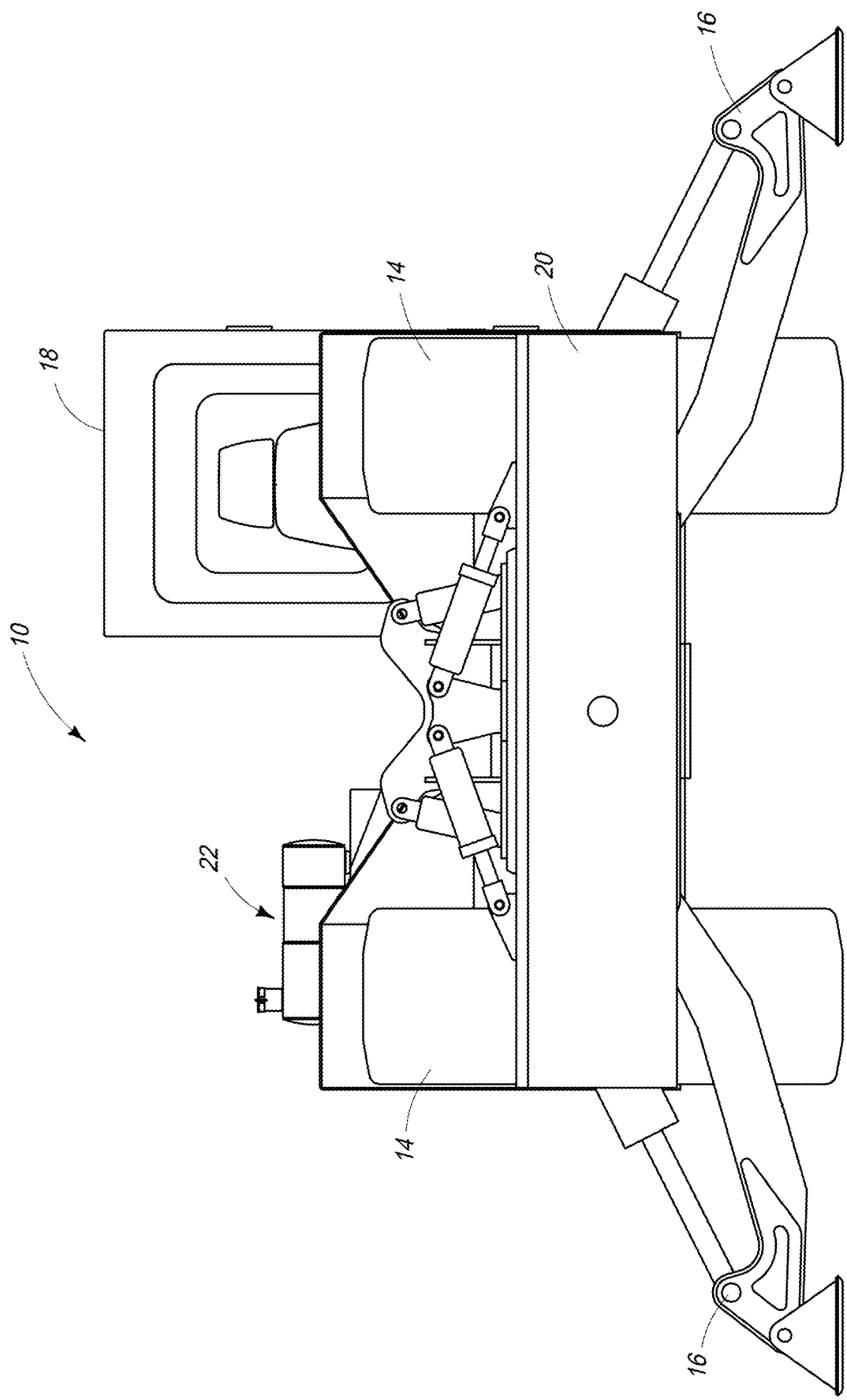
FIG. 2 is a front view of the all-terrain construction vehicle of FIG. 1 according to an embodiment of the disclosure.

Referring next to FIG. 2, a front view of all-terrain construction vehicle 10 is shown that includes a depiction of the extended levelers 16, wheels 14, and a muffler above hydraulic pump/engine 22 and cab 18. As can be seen, hydraulic pump/engine 22 is offset from cab 18 upon frame 12, for example. More particularly, engine 22 and cab 18 oppose one another with frame 12 therebetween. Therein, engine 22 is along one side of the axis and cab 18 is along the other side.

Figure 3:
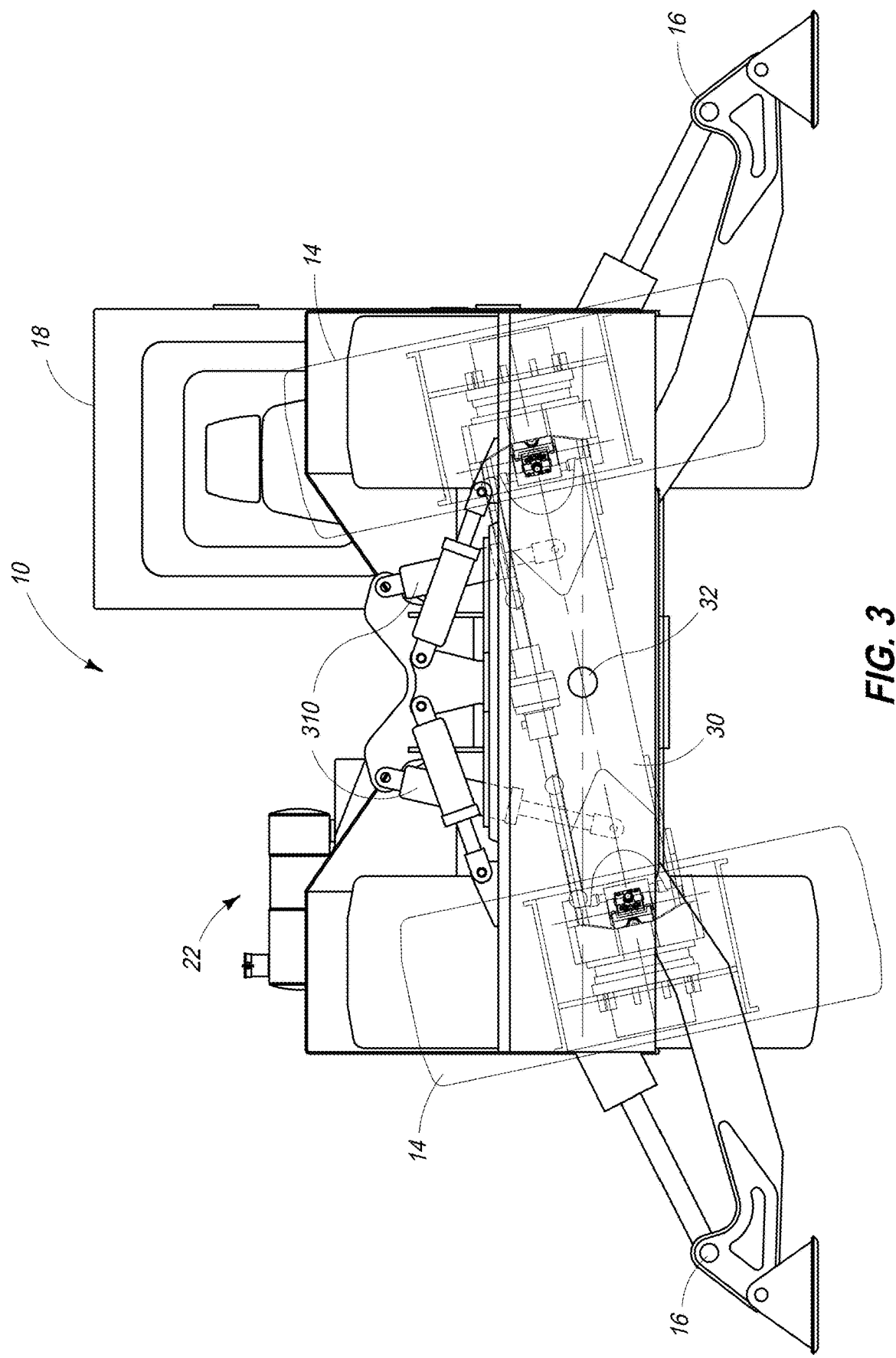
FIG. 3 is a front view of the all-terrain construction vehicle of FIG. 1 in one orientation according to an embodiment of the disclosure.

Referring next to FIG. 3, according to one orientation, vehicle 10 may be upon a nonplanar surface, wherein perhaps front wheels 14 are offset from rear wheels 14. Wheels 14 can reside along an axle 30, and this axle 30 may also pivot upon frame 12, for example, allowing for the rotation of the axle wheel assembly as shown in FIG. 3. More particularly, vehicle 10 can include a pair of axles. One of the pair of axles 30 as shown can be associated with the front end of vehicle 10 and the other of the pair can be associated with the rear end of the vehicle. As shown, each of the axles can extend substantially normally across the one axis. By substantially normally, the axles may extend away from the axis at a functional angle. Either or both of the two axles may be configured to pivotably couple with frame 12 at a point such as shown at point 32 for example.

Figure 4:
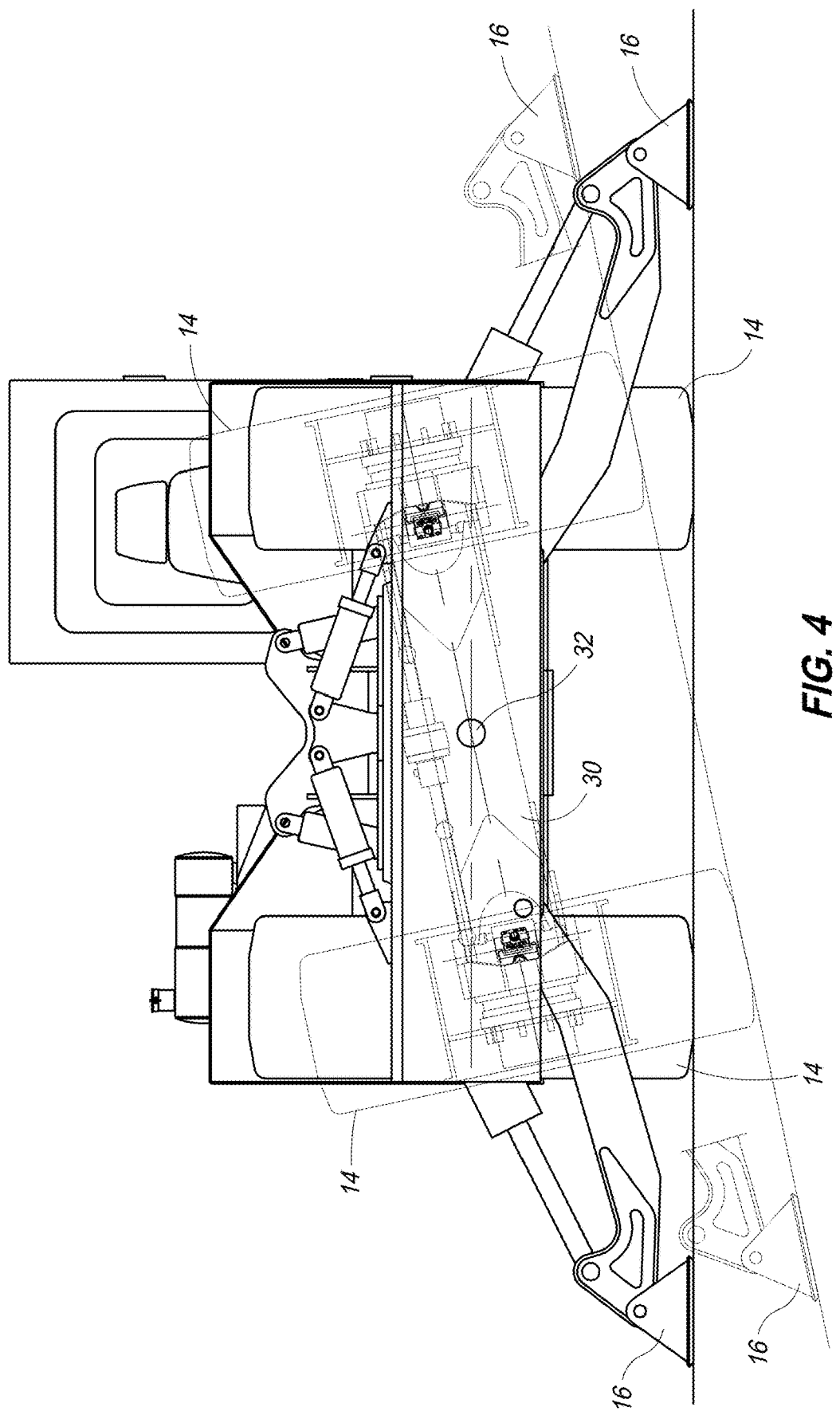
FIG. 4 is the all-terrain construction vehicle of FIG. 1 in another orientation according to an embodiment of the disclosure.

Referring to FIG. 4, the wheel assembly and levelers can be aligned wherein axle 30 and axis point 32 are juxtaposed from rear wheels in the vehicle, and levelers 16 associated with the rear of the vehicle are aligned with the rear wheels, while the levelers in the front of the vehicle are aligned with the front wheels, thereby allowing for hillside leveling, according to an embodiment of the disclosure.

In the box beam configuration, opposing opening through the walls of the box beam can be provided. Axle 30 can extend through these openings and pivotably couple.

Figure 4A:
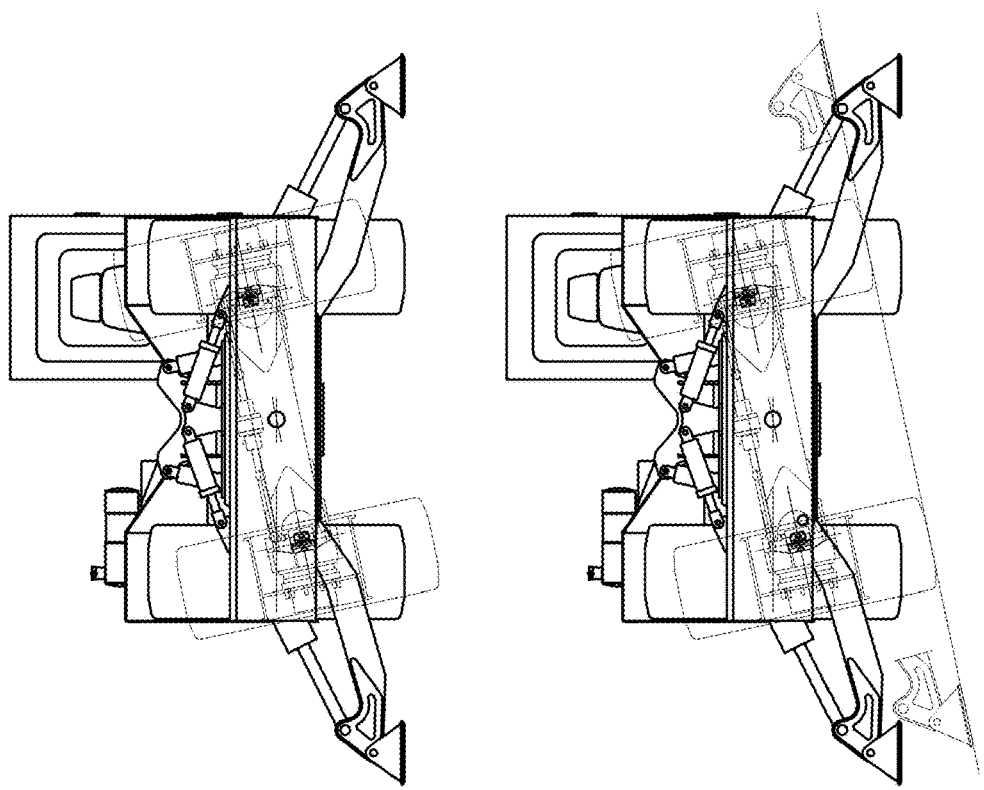
FIG. 4A depicts the all-terrain construction vehicle of FIG. 1 in multiple configurations.
Figure 4A:
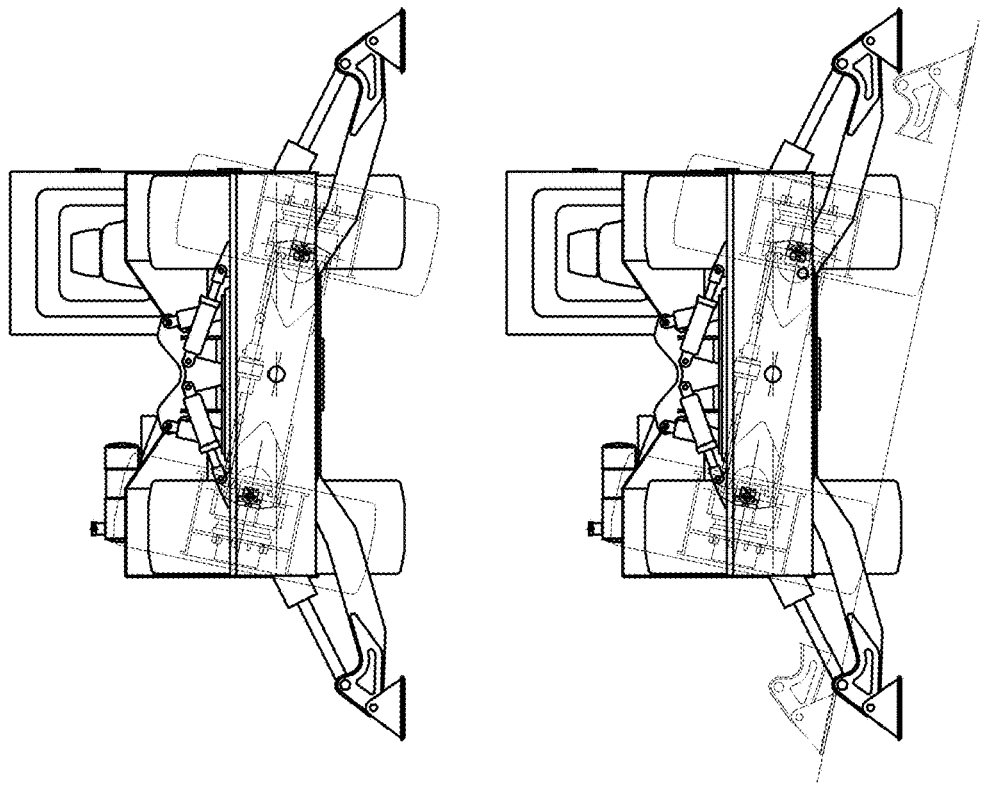

Various configurations of the axles and levelers of vehicle 10 are shown in FIG. 4A. The leveling can allow the chassis to be leveled completely plumb for stationary work when using a main attachment such as a man lift or digger derrick, for example. The axle leveling can allow for rough chassis leveling during travel to increase stability while traveling along a hillside.

In accordance with example implementations, vehicle 10 may be equipped with auto leveling systems that provides for the auto leveling of vehicle 10 in the ambulatory or stationary configuration. As an example, when auto leveling is engaged, the electronic control system sends a signal to the rear axle leveling valve which will send hydraulic oil to the rear axle levelling cylinders keeping the machine level when stationary or moving. The front axle can "float" when auto level is engaged. Float refers to allowing the axle to tilt freely along axis 32. Vehicle 10 can include a "front axle float" mode where the rear axle is locked, and the front axle floats. Vehicle 10 can also be tilted manually where the operator tilts the machine manually which engages both the front and rear axles.

Figure 5:
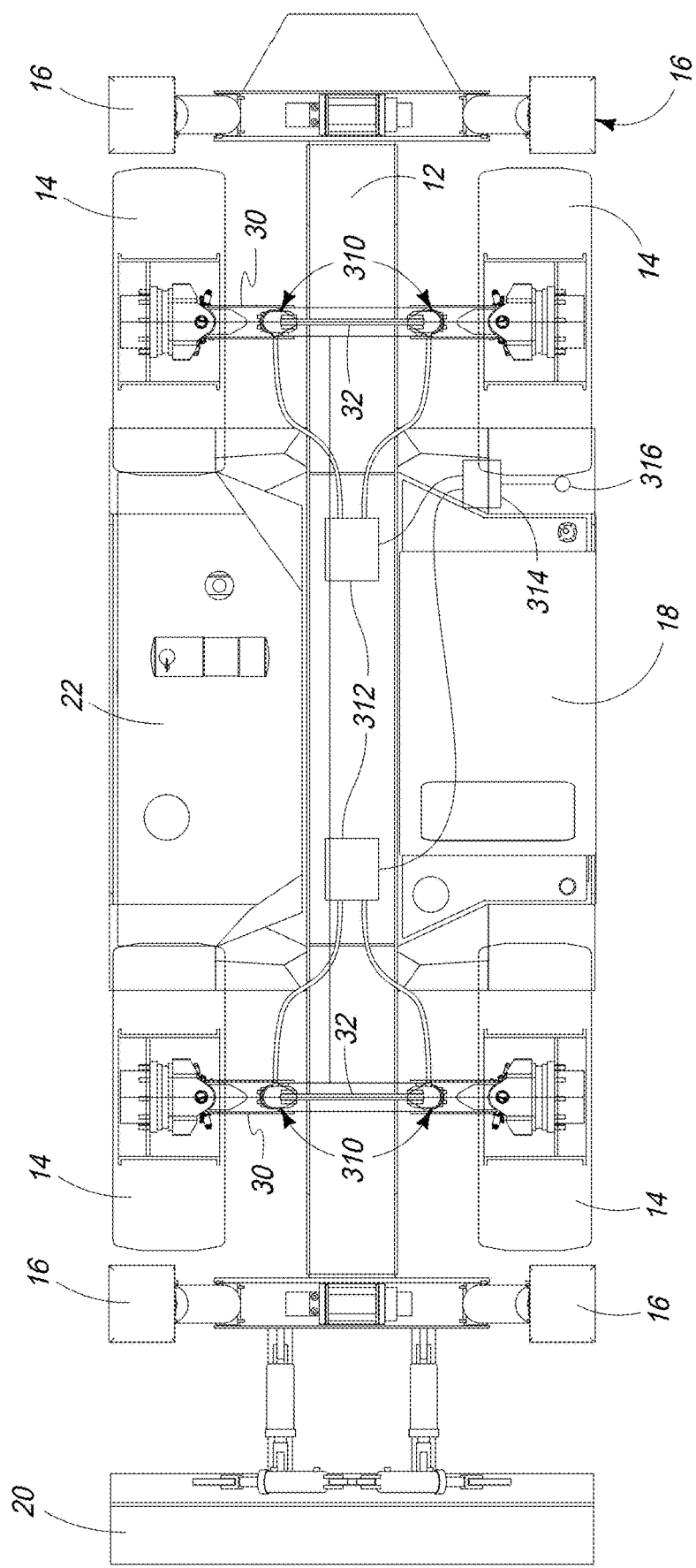
FIG. 5 is a top view of the all-terrain construction vehicle of FIG. 1 according to an embodiment of the disclosure.

Referring next to FIG. 5, a top view of vehicle 10 is shown wherein the blade 20, levelers 16, wheels 14, and pivot points 32 (part of the one axis) and axles 30 are aligned along frame 12 with cab 18 opposing engine 22.

As shown, at least two pairs of wheels are provided, with each wheel of each pair operatively coupled to each end of each respective axle 30. Each of the wheels pivotably couple with each end of the axle and are configured to pivot in parallel with an opposing wheel as is depicted in FIGS. 6-9. The wheels may pivotably couple about another axis that is substantially normal to the axis of points 32. Each wheel includes an independent wheel drive having variable hydraulic motors. For example, Planetaries: Auburn 160CD triple reduction compact final drive and Danfoss H1 80 cc cartridge motor with speed sensing can be utilized as part of a rim that will support tires such as forestry tires that are 64"OD×24" wide.

Figure 6:
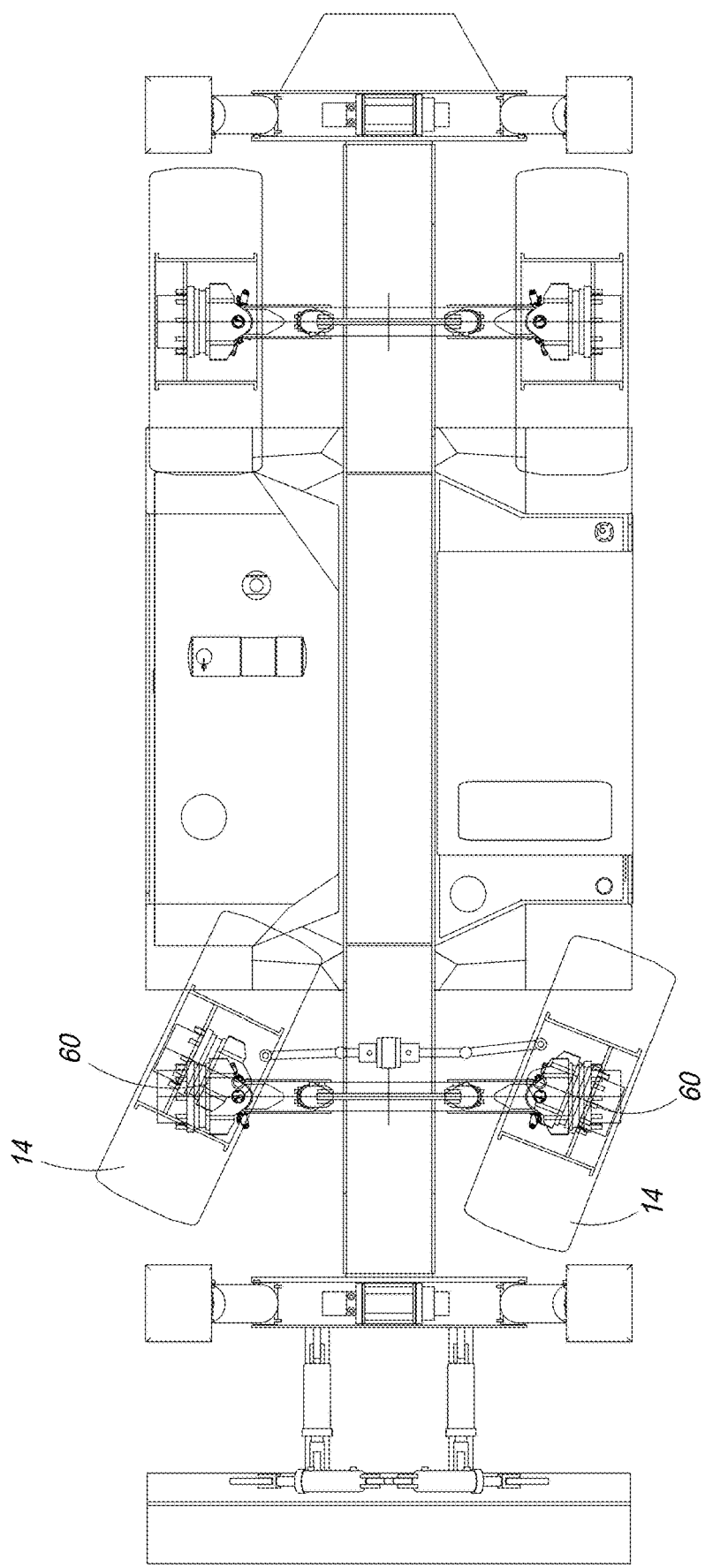
FIG. 6 is a top view of the all-terrain construction vehicle of FIG. 5 in another orientation according to an embodiment of the disclosure.
Figure 7:
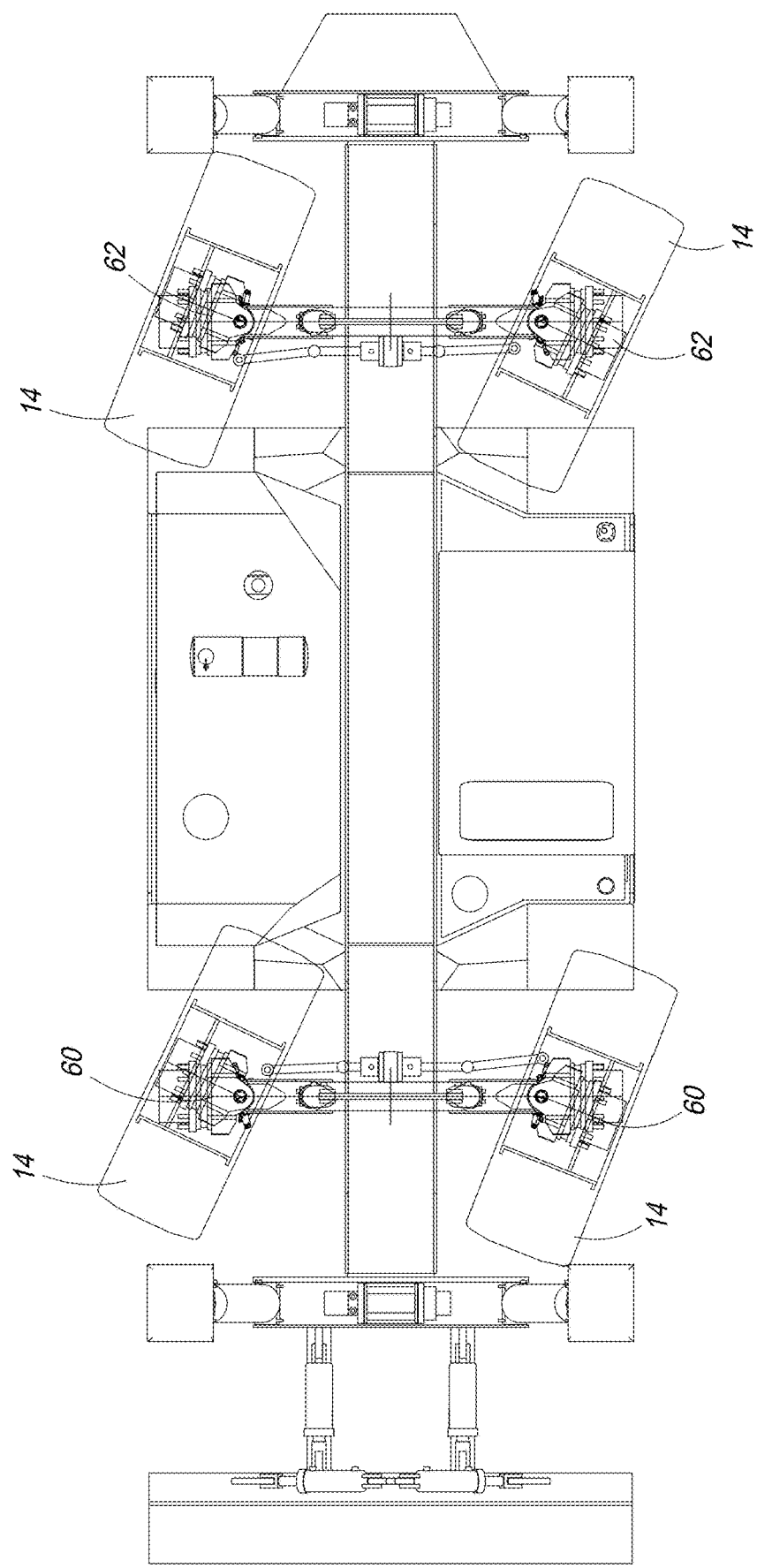
FIG. 7 is a top view of the all-terrain construction vehicle of FIG. 5 in another orientation according to an embodiment of the disclosure.
Figure 8:
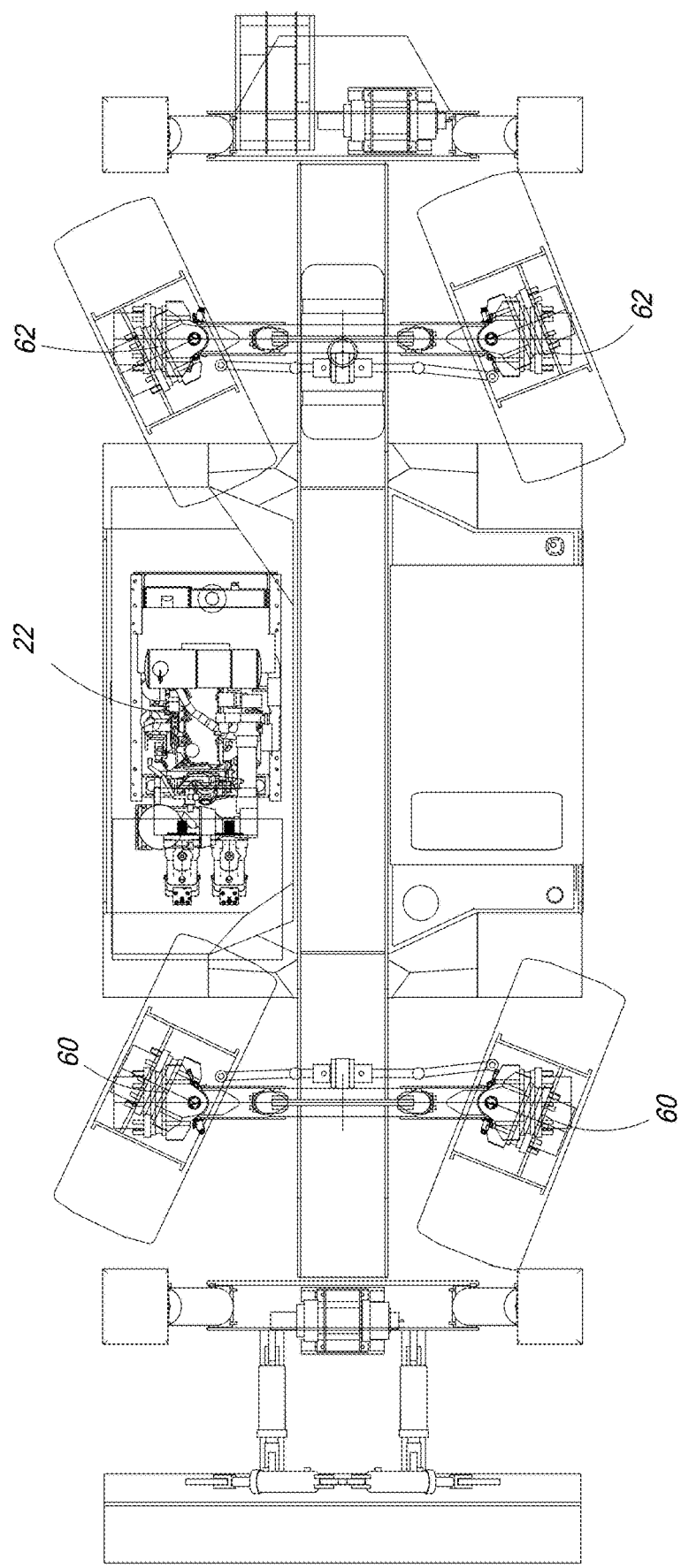
FIG. 8 is a top view of the all-terrain construction vehicle of FIG. 5 in another orientation according to an embodiment of the disclosure.

Referring to FIG. 6, according to one orientation, wheels 14 at the front of vehicle 10 are shown in a slightly turned position. Referring to FIG. 7, both front and rear wheels are turned in the same direction, allowing for independent turning of wheels 14 at hubs 60 and 62, for example. Referring to FIG. 8, again according to another orientation, wheels move independently of one another wherein front wheels are turned in one direction, and rear wheels are turned in the opposing direction.

Figure 9:
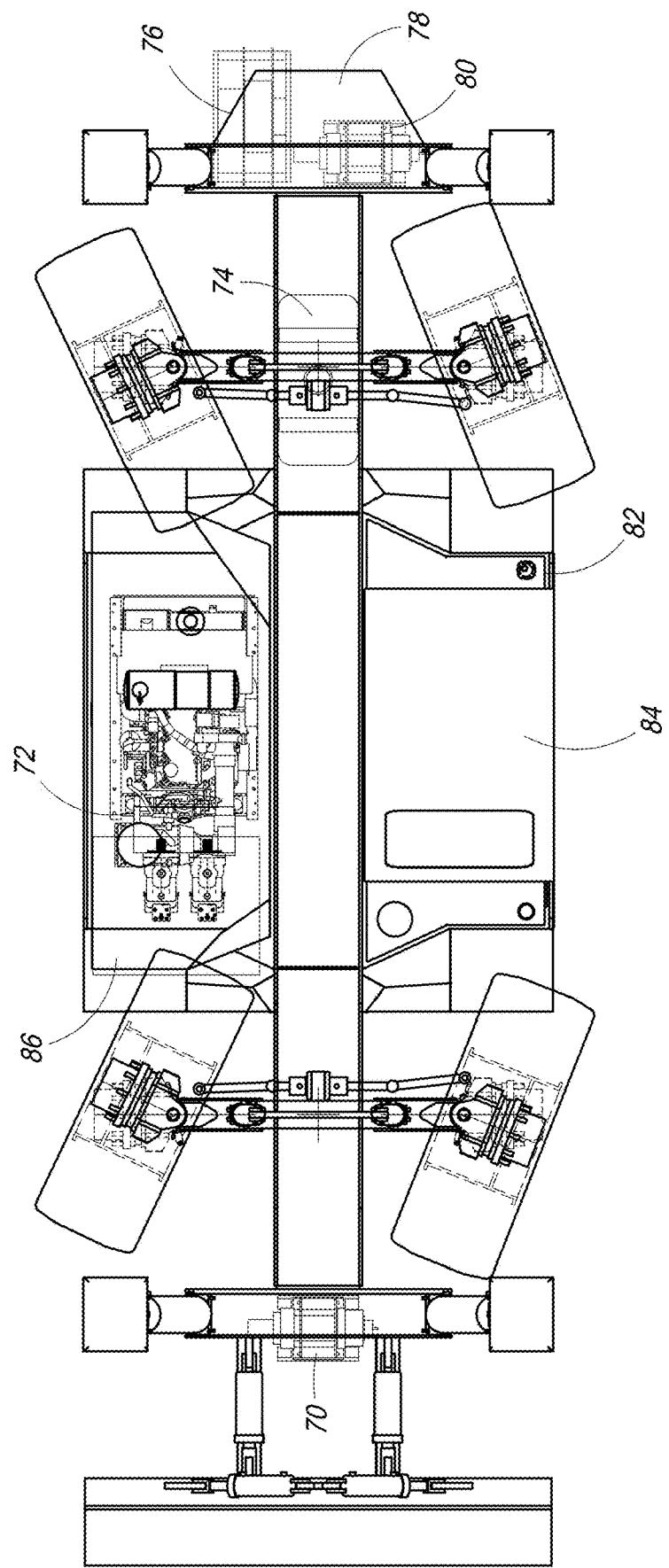
FIG. 9 is a top view of the all-terrain construction vehicle of FIG. 1 depicting additional components of the vehicle.
Figure 10A:
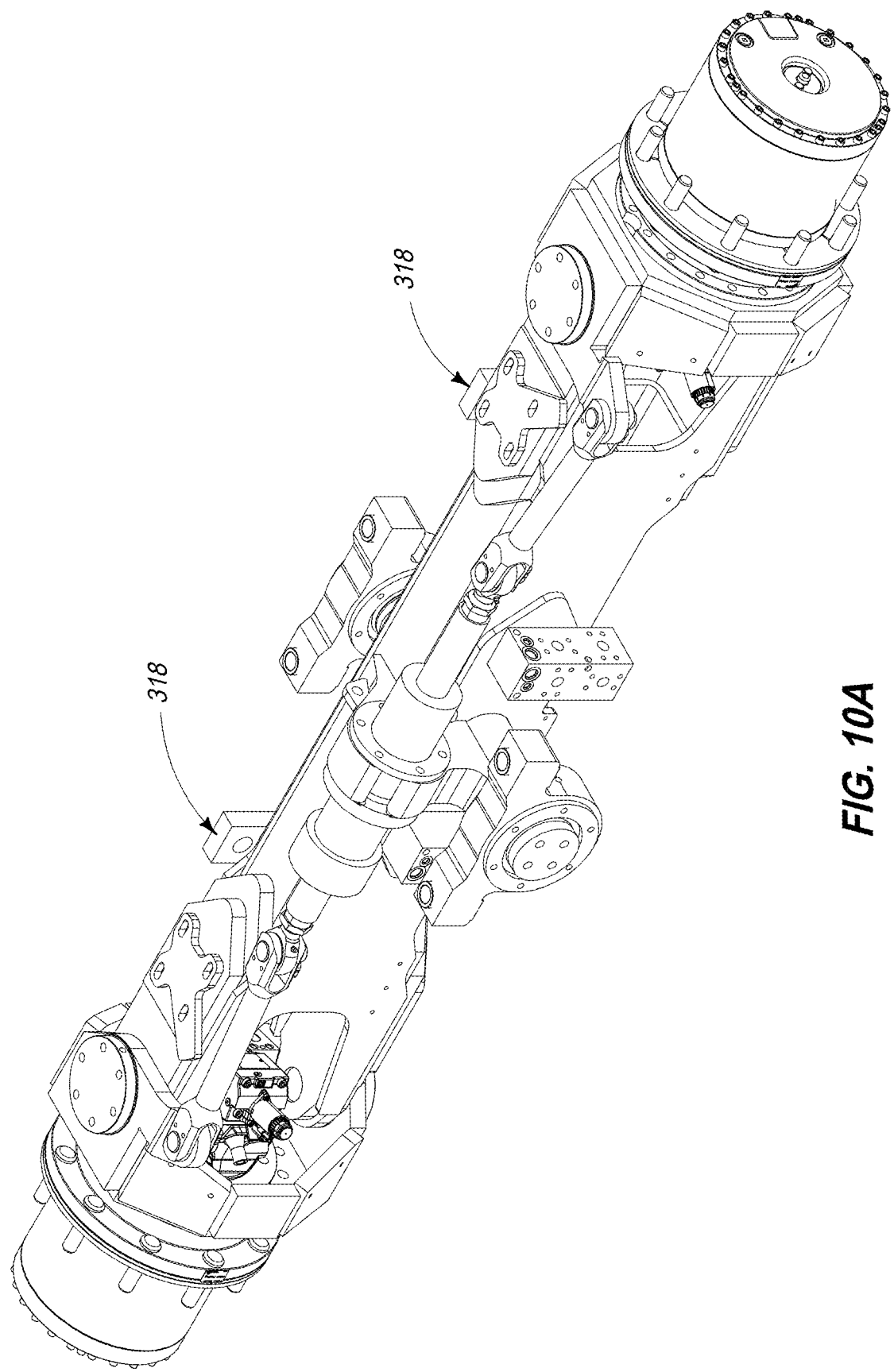
FIGS. 10A-D are views of axle and wheel assemblies of the present disclosure according to an embodiment.
Figure 10B:
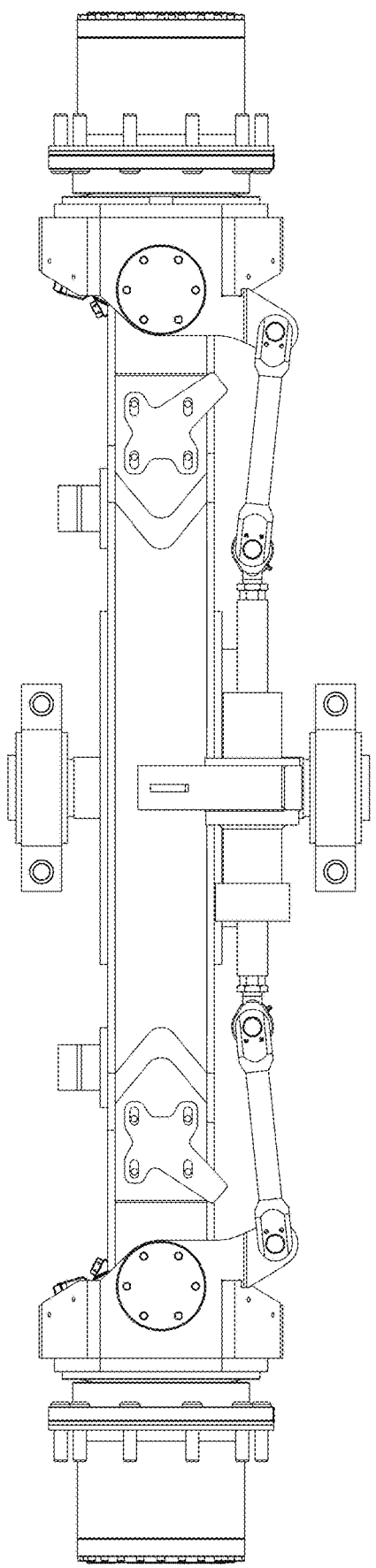
Figure 10C:
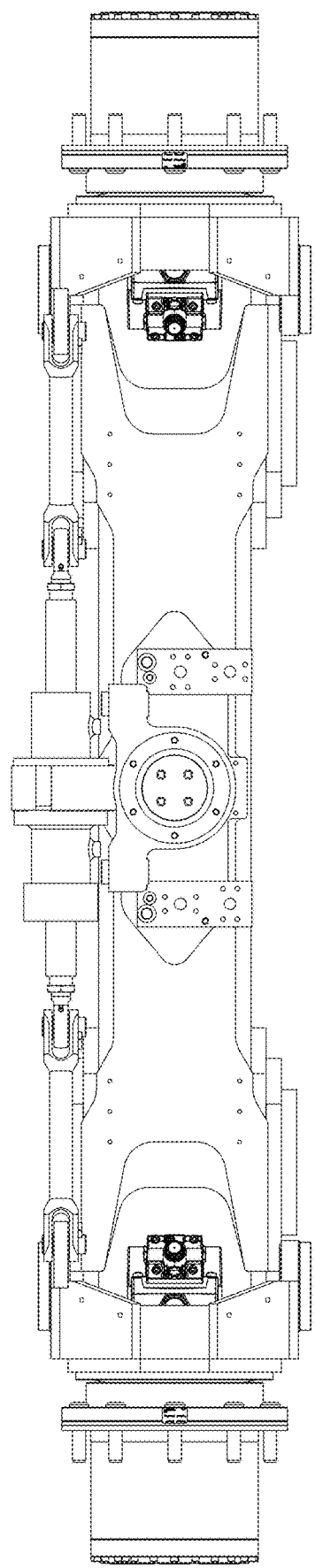
Figure 10D:
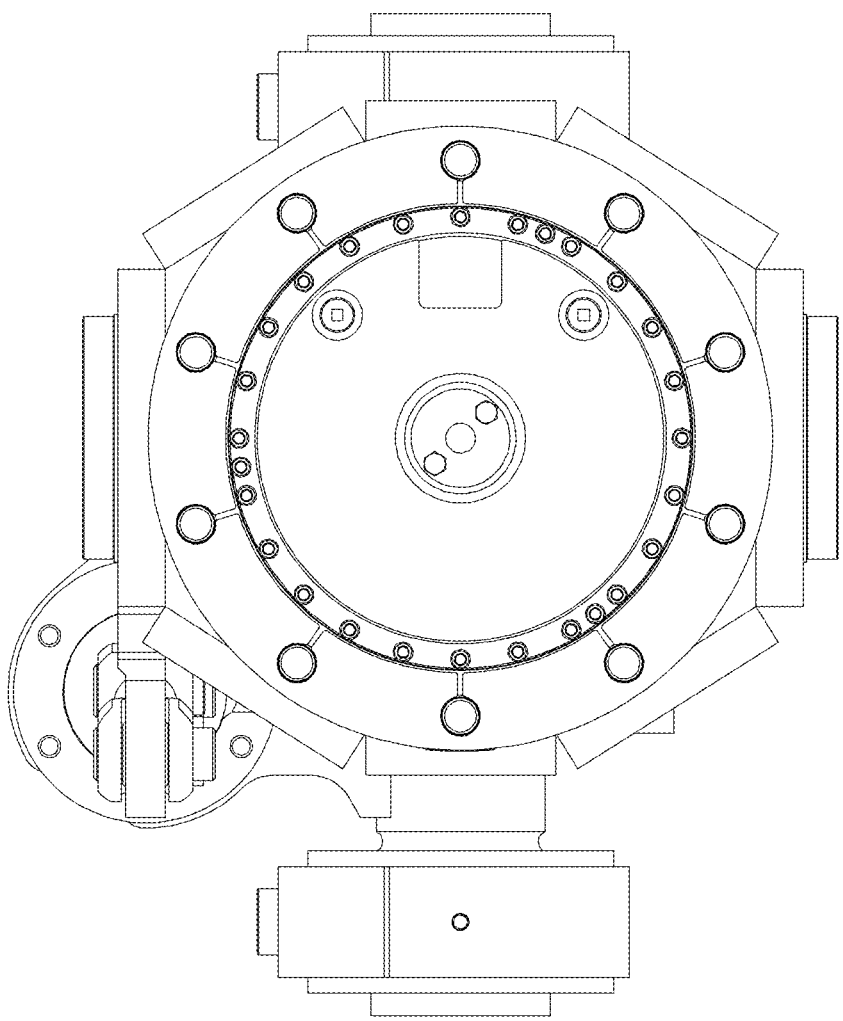
Figure 11:
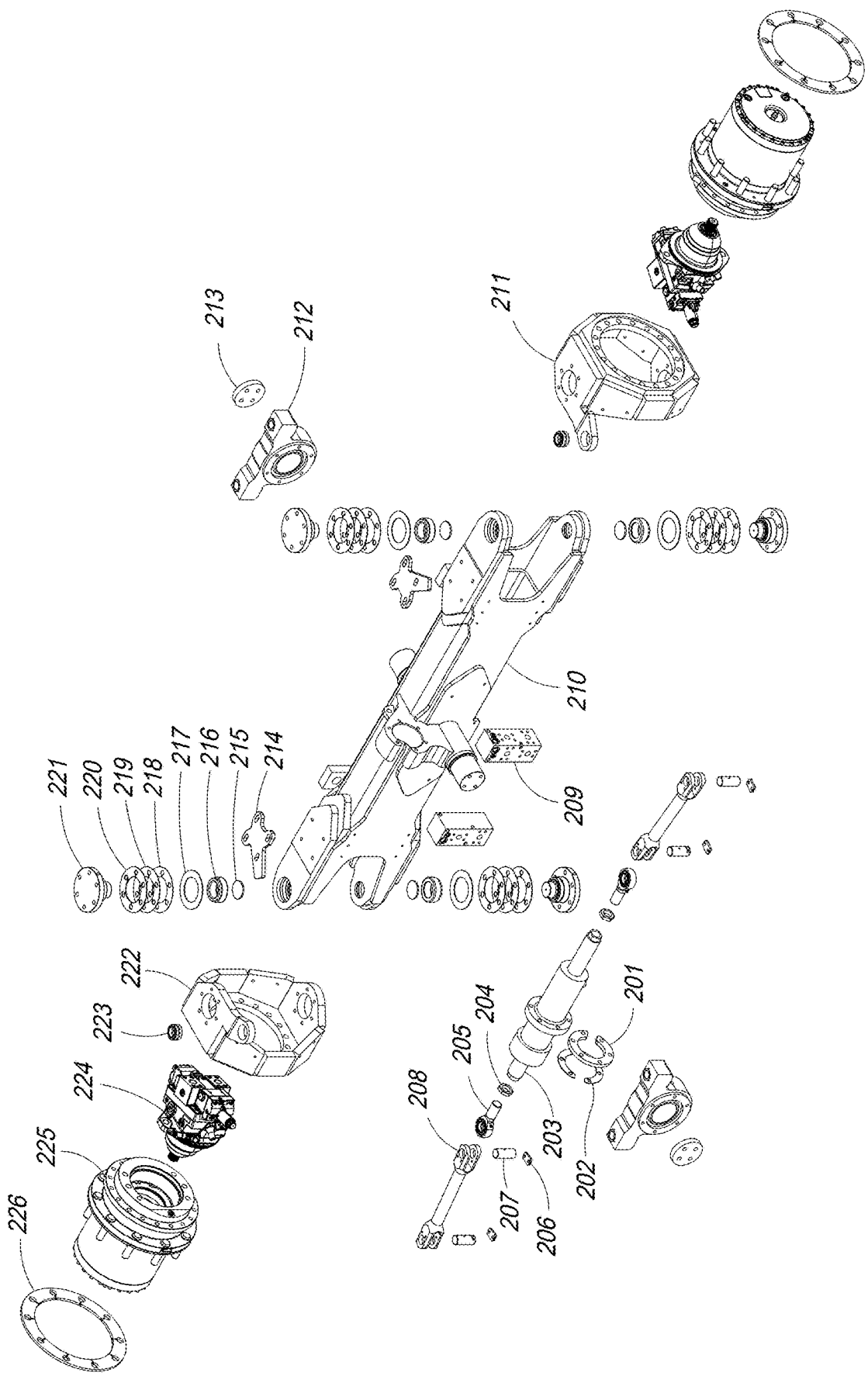
FIG. 11 is an exploded view of the axle and wheel assemblies of FIGS. 10A-D.

Referring to FIG. 9, a top view of the all-terrain construction vehicle of FIG. 1 is shown depicting additional components of the vehicle, for example, front and rear winches 70 and 80. Engine pump unit 72 can be a hydraulic fluid pump unit such as the Cummins QSB6.7L 260HP for example. This unit can provide for both hydraulic pumping to open and closed loop systems as well as electrical energy production for operable use of vehicle 10. Hydraulic fluid can be stored in tank 86 and a water tank 74 can be provided with an electric pump if desired. Dual hose reels 76 and tool boxes 78 can also be provided. A fuel tank 82 can be provided on the opposing side of the axis along with operator cab 84 which can be equipped with an air ride system. The vehicle may also be equipped with a roll over protection system.

Unit 72 can be operatively coupled to the axles, wheels, blades, the levelers and/or attachments via hose and control valves as well as the operator interface control panel within the operator cab. The wheels may be coupled to a hydrostatic (closed loop) pump.

Referring to FIGS. 10A-10D and 11 various views of an axle assembly according to an embodiment of the disclosure are shown. About axle 210 can be axle spindles 211 and 222. Coupling axle 210 to frame 12 can be axle tilt trunnion carrier 212 and axle tilt trunnion retainer 213. About spindles 211 and 222, respectively can be bearing 223, hydrostatic wheel drive motor 224, wheel drive 225, and wheel spacer 226. Coupling this wheel assembly to axle 210 can be axle steering stop 214, axle king pin cap 215, contact spherical bearing 216, axle king pin dust washer 217, axle king pin shims 218, 219, and 220, and axle king pin trunnion 221. Axle motor bulkhead 209 can also be provided.

Axle components for operatively pivoting the wheel assemblies about axle 210 can include axle steer cylinder support 201, axle steer cylinder shim 202, steer cylinder 203, hardened steel thin hex nut 204, male rod head 205, steering link pin retainer 206, axle steering link pin 207, and axle steering link 208. The overall dimensions of an example axle/wheel assembly can be for example 101.95" in length, a height of 19¹¹⁄₁₆" and width of 23¾'.

Figure 12:
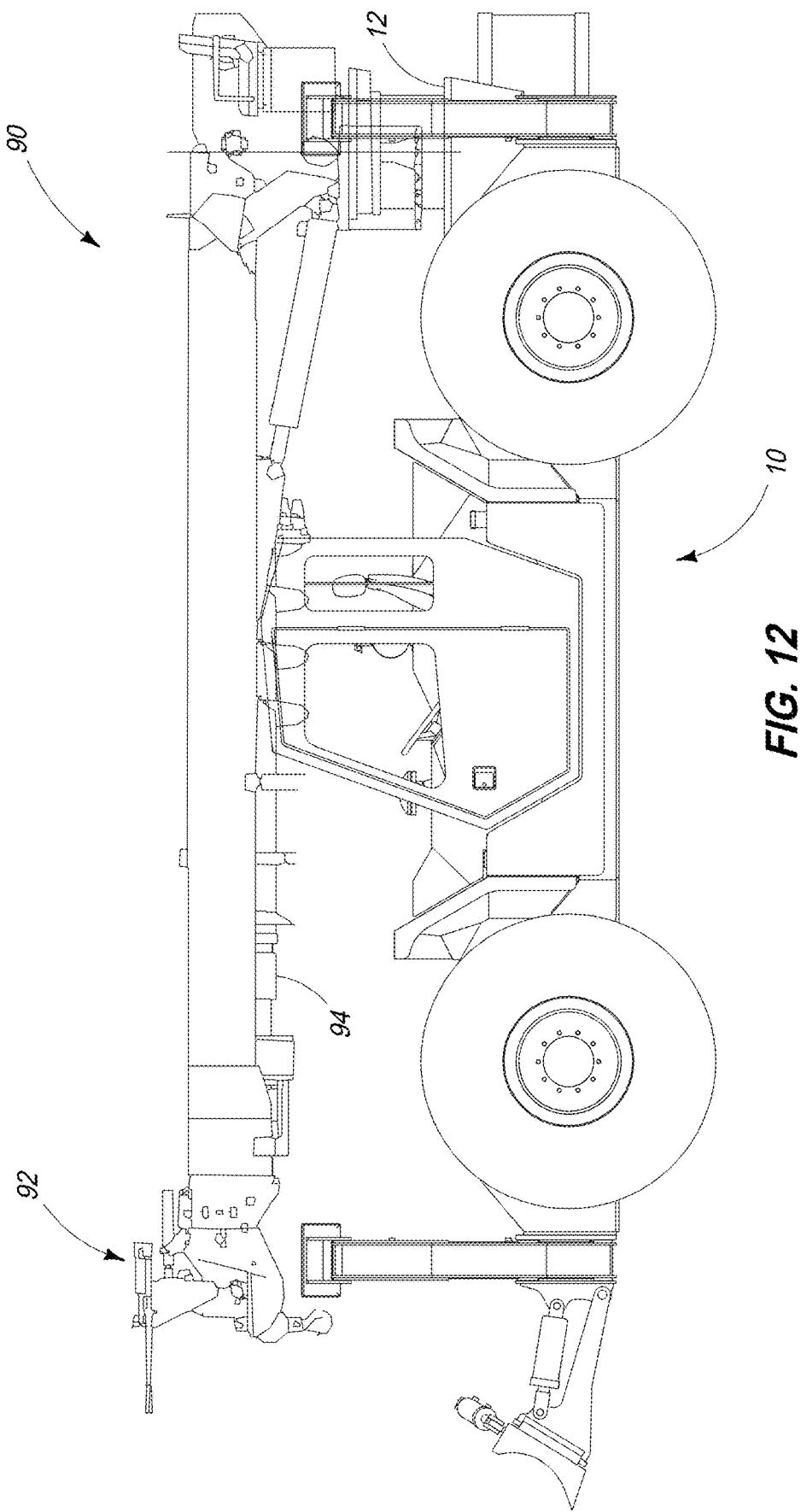
FIG. 12 is a depiction of an all-terrain construction vehicle having a digger derrick assembly attached thereto according to an embodiment of the disclosure.

Referring to FIG. 12, an additional apparatus is shown attached to construction vehicle 10. This apparatus in this embodiment is a digger derrick 90, for example. Digger derrick 90 can have a pole picker end 92 as well as a digging apparatus 94. Digger derrick 90 can be coupled to frame 12 at the rear end portion of construction vehicle 10, for example. This is just one example of an attachment for vehicle 10. As shown, these attachments couple with vehicle 10 at the rearward portion of the vehicle, but they also extend above the axis of the frame and between the pump unit and operators cab.

Figure 13:
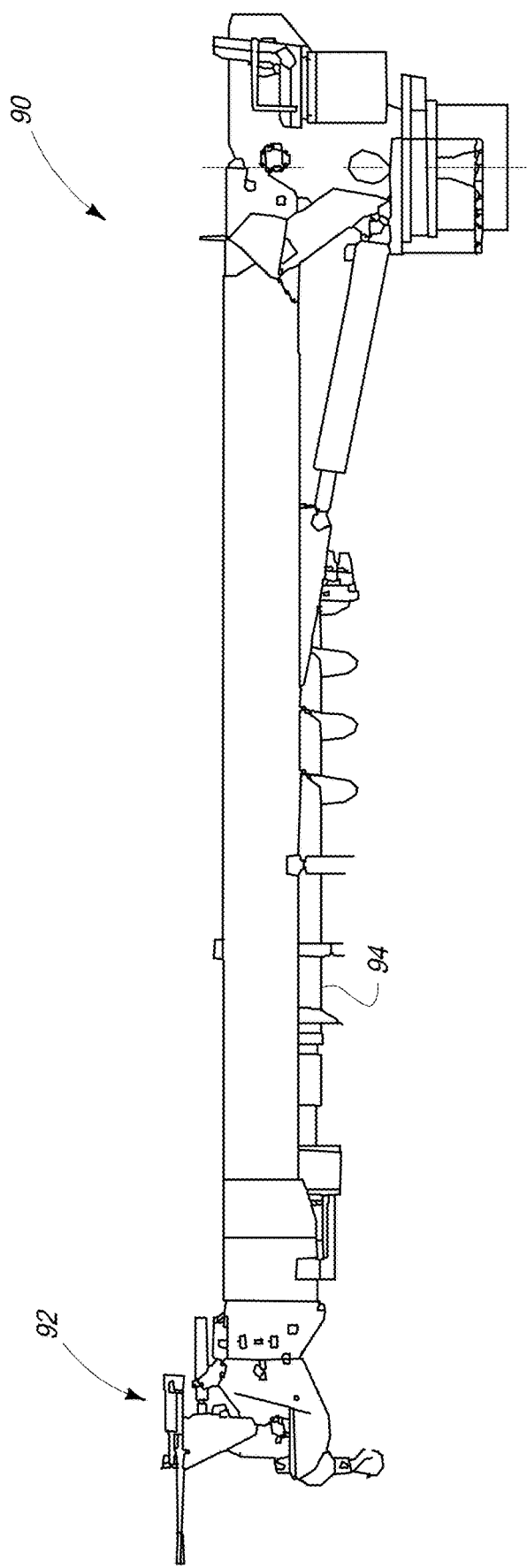
FIG. 13 is a more detailed view of the digger derrick assembly of FIG. 12 according to an embodiment of the disclosure.
Figure 14:
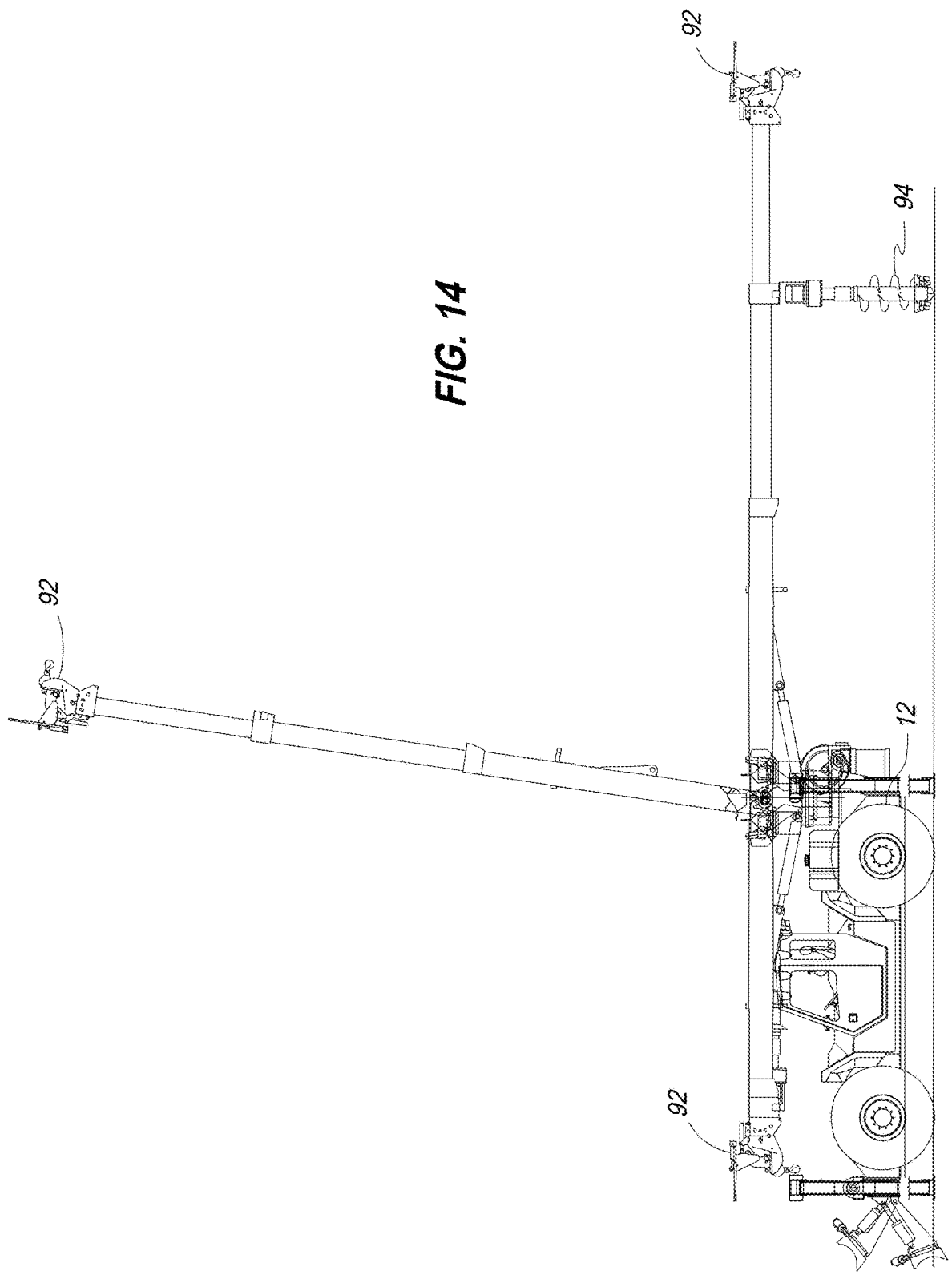
FIG. 14 is a depiction of the all-terrain construction vehicle according to an embodiment of the disclosure with depictions of the digger derrick assembly in three separate configurations according to embodiments of the disclosure.

Referring to FIG. 13, digger derrick 90 is shown in more detail alone, having pole picker end 92 and digger 94, for example. The digger derrick can include telescoping members, an auger, and a hook. In accordance with example implementations and with reference to FIG. 14, digger derrick 90 is shown in three positions; one in the stationary position, or traveling position; another in the pole picking position; and another in the digging position.

Figure 15:
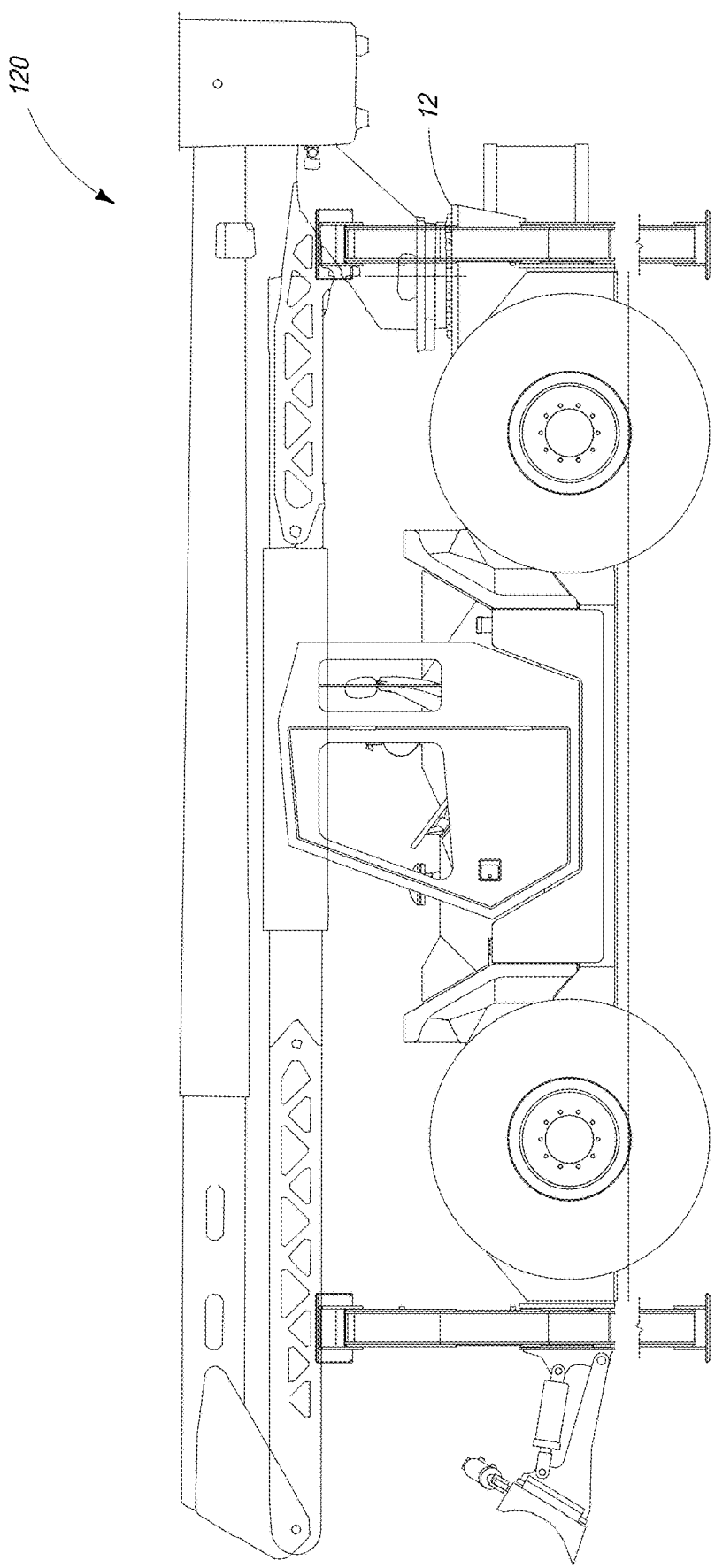
FIG. 15 is an all-terrain construction vehicle that includes a man lift assembly according to an embodiment of the disclosure.
Figure 16:
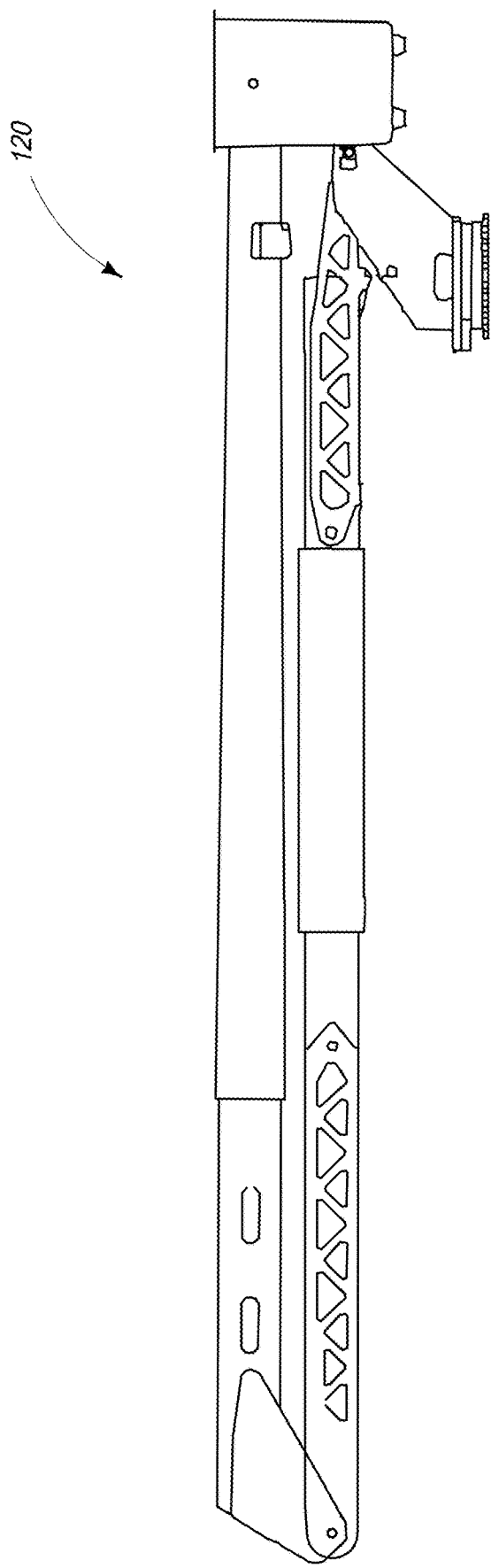
FIG. 16 is a detailed view of the man lift assembly of FIG. 13 according to an embodiment of the disclosure.

Referring to FIG. 15, all-terrain construction vehicle 10 is shown with a man lift attachment, and this attachment as well is coupled to frame 12 at the rear portion. FIG. 16 depicts the man lift assembly as well separate from vehicle 10. As shown, the man lift assembly can include articulating members coupled to a man bucket.

Figure 17:
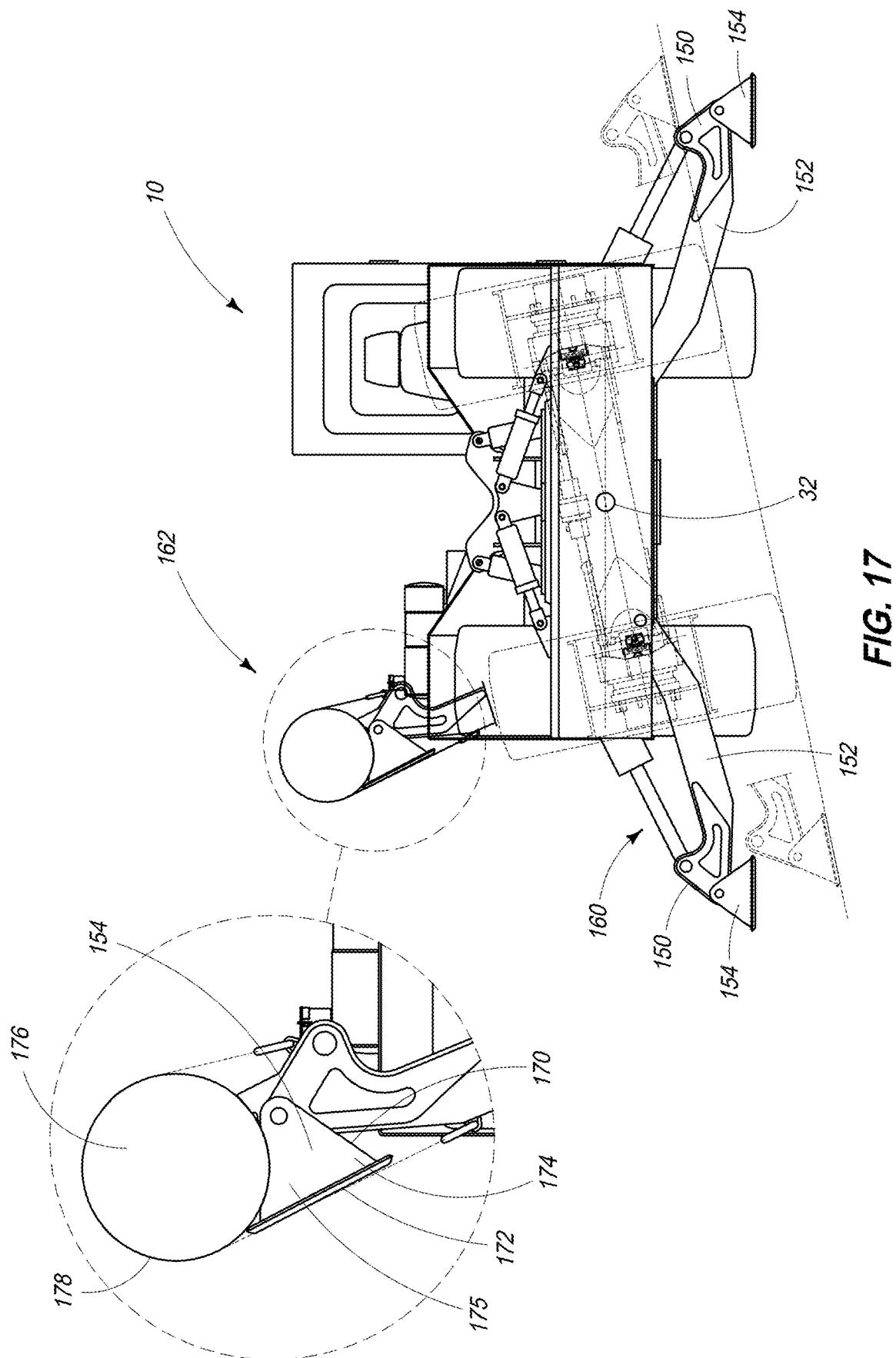
FIG. 17 is an elevation of an all-terrain construction vehicle that includes levelers configured to support a utility pole during transportation according to an embodiment of the disclosure.

Referring next to FIG. 17, according to another embodiment of the disclosure, vehicle 10 can include at least two pairs of levelers 150, one pair associated with the rear end of vehicle 10 and another pair associated with the front end of vehicle 10. Each of the levelers 150 can include an arm 152 and a foot 154. Arm 152 can extend from the axis of 32 and can be configured to have one end of the arm pivotably couple to the frame about that axis. Arm 152 can extend substantially normally to the one axis according to an implementation. The arm can be configured and controllable to pivot between a first position 160 for stationary use and a second position 170 during ambulatory use or the travel position.

In the travel position 170, foot 154 can be configured to support a utility pole for example. Foot 154 can be configured to pivotably coupled with arm 152 and can include a base 172 and a member 174 connecting the base with the arm. In accordance with example implementations, the member can be a pair of members embracing the arm therebetween. Member 174 can include an arcuate portion 175 configured to receive the curved exterior 178 of a utility pole 176. In this configuration, with levelers of the same side of the axis in the travel position, a utility pole 176 can extend therebetween and above the pump unit across from the operator cab. Pole 176 can be coupled to the levelers in the travel position by conventional means.

Figure 18:
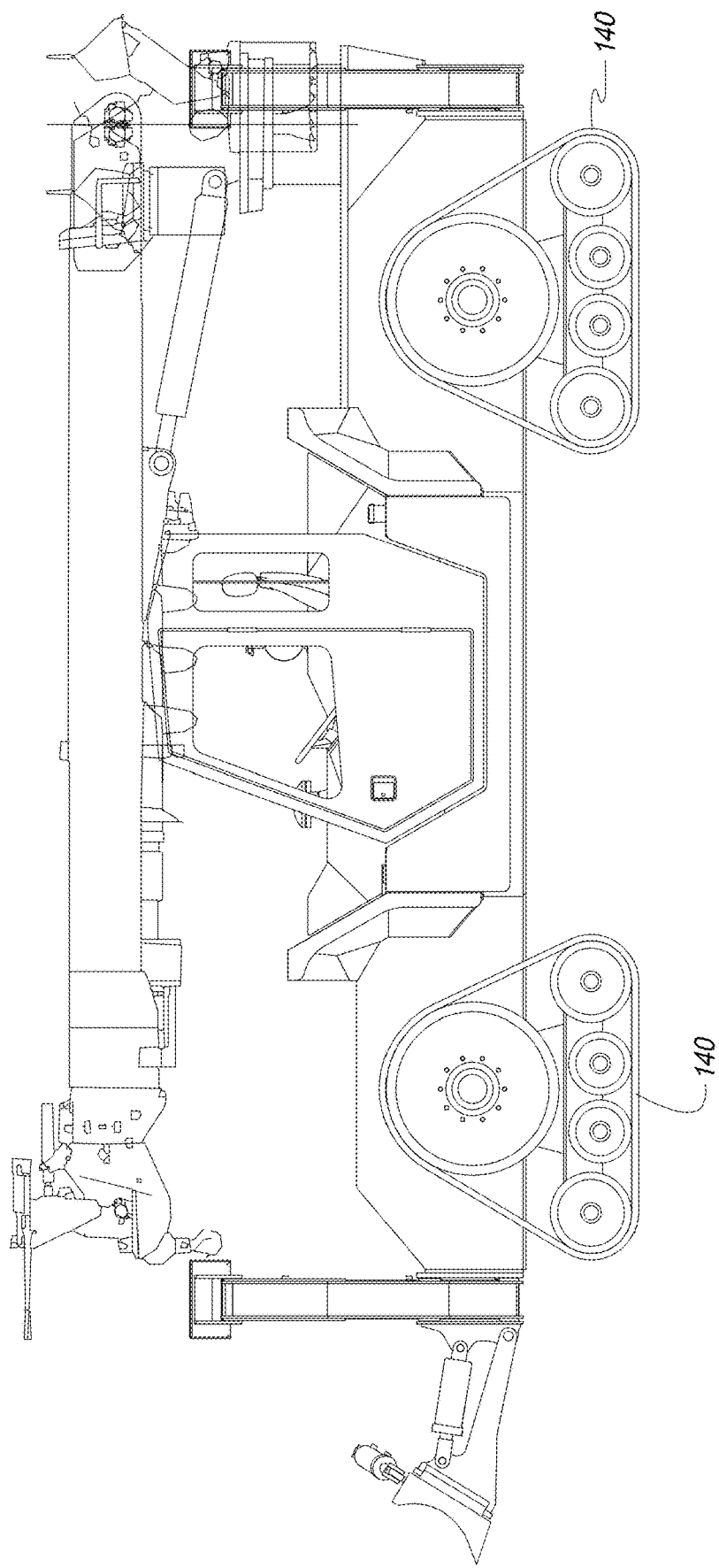
FIG. 18 is an all-terrain construction vehicle of the disclosure in a track rather than wheel configuration.
Figure 19:
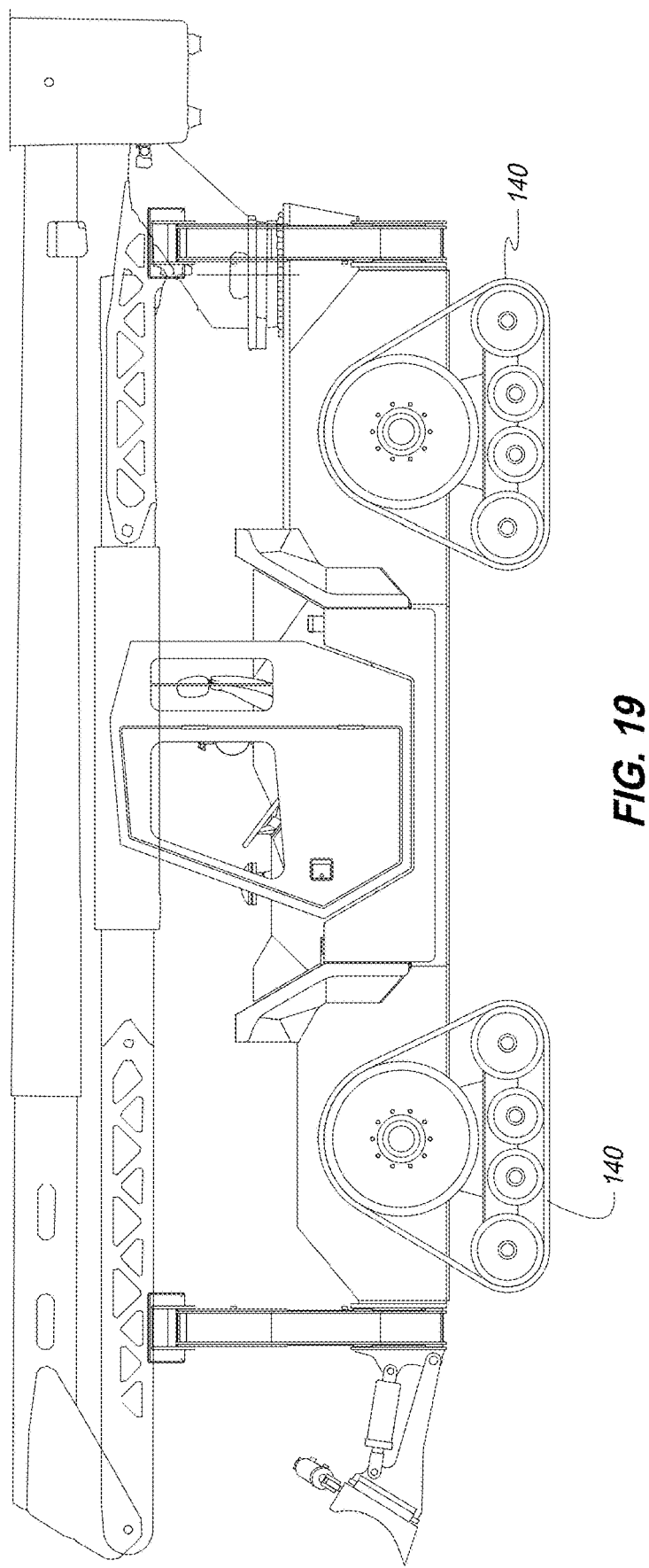
FIG. 19 is another depiction of the all-terrain construction vehicle of FIG. 18 having a man bucket apparatus attached thereto.

FIGS. 18 and 19 depict the all-terrain construction vehicle having track configurations rather than wheels. These track assemblies are commercially available.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:
1. An all-terrain construction vehicle comprising:
a central beam frame extending from a rear end of the vehicle to a front end of the vehicle, the length between the rear end of the beam frame to the front end of the frame defining at least one axis;

a pair of axles, one associated with the rear end of the vehicle and the other associated with the front end of the vehicle, individual ones of the axles defining individual intersections of the one axis, each of the axles rotating about the intersection;

at least two pairs of wheels, each wheel of each pair operatively coupled to each end of each respective axle, each of the wheels pivotably attached to each end and configured to pivot in parallel with an opposing wheel;

an operator cab along one side of the one axis;

a hydraulic fluid pump unit along the opposing side of the one side of the one axis, the hydraulic fluid pump unit and fluid therefrom operatively coupled to the axles and wheels; the axles, wheels, and pump being operatively controlled via an operator interface within the operator cab; and at least two sets of levelers; one set associated with the rear end of the vehicle and the other set associated with the front end of the vehicle, the pump and fluid therefrom operatively coupled to the levelers and controlled via an operator interface within the operator cab, wherein each of the levelers comprises and arm and a foot, the foot being configured to support a utility pole above the hydraulic pump while the leveler having the foot is in a traveling position.

2. The all-terrain construction vehicle of claim 1 wherein the beam frame is configured as a box beam.

3. The all-terrain construction vehicle of claim 1 further comprising at least one set of levelers, the pump and fluid therefrom operatively coupled to the levelers and controlled via an operator interface within the operator cab.

4. The all-terrain construction vehicle of claim 1 wherein each of the axles comprises a hydraulic motor.

5. The all-terrain construction vehicle of claim 1 further comprising a digger derrick operatively coupled toward the rear end of the central frame and extending above the one axis and between the cab and hydraulic fluid pump unit.

\* \* \* \* \*